United States Patent
Wang et al.

(10) Patent No.: US 9,202,281 B2
(45) Date of Patent: Dec. 1, 2015

(54) INTEGRATED INTERACTIVE SEGMENTATION WITH SPATIAL CONSTRAINT FOR DIGITAL IMAGE ANALYSIS

(75) Inventors: Su Wang, San Jose, CA (US); Shengyang Dai, San Jose, CA (US); Xun Xu, Palo Alto, CA (US); Akira Nakamura, San Jose, CA (US); Takeshi Ohashi, Kanagawa (JP); Jun Yokono, Tokyo (JP)

(73) Assignee: Sony Corporation, Tokyo (JP)

( * ) Notice: Subject to any disclaimer, the term of this patent is extended or adjusted under 35 U.S.C. 154(b) by 162 days.

(21) Appl. No.: 13/423,209

(22) Filed: Mar. 17, 2012

(65) Prior Publication Data
US 2013/0243308 A1  Sep. 19, 2013

(51) Int. Cl.
*G06K 9/00* (2006.01)
*G06T 7/00* (2006.01)

(52) U.S. Cl.
CPC .............. *G06T 7/0081* (2013.01); *G06T 7/0087* (2013.01); *G06T 7/0093* (2013.01); *G06K 9/00* (2013.01); *G06T 2207/20081* (2013.01); *G06T 2207/20144* (2013.01)

(58) Field of Classification Search
CPC ..... G06T 7/0081; G06T 7/0083; G06T 7/403; H04N 19/00624; H04N 19/00781; G03F 1/38; G03F 1/72; G03F 7/70683; B63C 11/12; G06K 9/36; G06K 9/62
USPC ......... 382/130, 154, 159, 103, 128, 166, 173, 382/282; 345/592; 348/155, 169; 600/425, 600/410
See application file for complete search history.

(56) References Cited

U.S. PATENT DOCUMENTS

| | | | | |
|---|---|---|---|---|
| 7,003,136 | B1 * | 2/2006 | Harville | G06K 9/00201 348/169 |
| 7,227,893 | B1 * | 6/2007 | Srinivasa | G06K 9/00771 348/155 |
| 7,672,516 | B2 | 3/2010 | Cremers et al. | |
| 7,822,252 | B2 * | 10/2010 | Bi | G06K 9/6218 378/4 |
| 7,840,503 | B2 * | 11/2010 | Narasimhan | G06K 9/6297 706/12 |
| 8,019,151 | B2 * | 9/2011 | Beilloin | G06T 9/00 382/162 |
| 8,358,691 | B1 * | 1/2013 | Wang | G06T 7/20 375/240.02 |
| 8,682,063 | B2 * | 3/2014 | Wang | G06K 9/6278 382/103 |
| 2003/0012439 | A1 * | 1/2003 | Lawton | G06K 9/325 382/173 |
| 2003/0117604 | A1 * | 6/2003 | Kobayashi | G03B 27/42 355/55 |
| 2005/0096758 | A1 * | 5/2005 | Takezawa | G05B 13/048 700/44 |

(Continued)

OTHER PUBLICATIONS

Y. Boykov, M.P. Jolly, "Interactive Graph Cuts for Optimal Boundary and Region Segmentation of Objects in N-D Images", 2001, vol. 1, pp. 105-112, In Proceedings of ICCV.

(Continued)

*Primary Examiner* — Vu Le
*Assistant Examiner* — Aklilu Woldemariam
(74) *Attorney, Agent, or Firm* — Haverstock & Owens LLP

(57) ABSTRACT

An integrated interactive segmentation with spatial constraint method utilizes a combination of several of the most popular online learning algorithms into one and implements a spatial constraint which defines a valid mask local to the user's given marks. Additionally, both supervised learning and statistical analysis are integrated, which are able to compensate each other. Once prediction and activation are obtained, pixel-wised multiplication is conducted to fully indicate how likely each pixel belongs to the foreground or background.

30 Claims, 5 Drawing Sheets

(56) References Cited

U.S. PATENT DOCUMENTS

| | | | |
|---|---|---|---|
| 2006/0056689 A1* | 3/2006 | Wittebrood | G06T 7/0081 382/173 |
| 2007/0248282 A1* | 10/2007 | Suzuki | G06T 5/008 382/282 |
| 2007/0255755 A1* | 11/2007 | Zhang | G06F 17/30799 |
| 2007/0280530 A1* | 12/2007 | Fung | G06K 9/6269 382/159 |
| 2008/0122858 A1* | 5/2008 | Wilensky | G06T 15/503 345/592 |
| 2008/0125648 A1* | 5/2008 | Bi | G06K 9/6218 600/425 |
| 2009/0136103 A1 | 5/2009 | Sonka et al. | |
| 2010/0046830 A1* | 2/2010 | Wang et al. | 382/164 |
| 2010/0111370 A1 | 5/2010 | Black et al. | |
| 2010/0220906 A1* | 9/2010 | Abramoff | G06K 9/6231 382/130 |
| 2010/0322489 A1 | 12/2010 | Tizhoosh et al. | |
| 2011/0206262 A1 | 8/2011 | Sammal et al. | |
| 2011/0293247 A1 | 12/2011 | Bhagavathy et al. | |
| 2013/0031354 A1* | 1/2013 | Furuichi | G06F 21/608 713/150 |
| 2013/0070983 A1* | 3/2013 | Rezaee | G06T 7/0012 382/128 |

OTHER PUBLICATIONS

Y. Li, J. Sun, C. K. Tang and H. Y. Shum, "Lazy Snapping", 2004, vol. 23, pp. 303-308, SIGGRAPH.

E. N. Mortensen, W. A. Barrett, "Interactive Segmentation with Intelligent Scissors", Sep. 1998, vol. 60 Issue 5, Graphical Models and Image Processing.

C. Rother, V. Komogorov, A. Blake, "GrabCut: Interactive Foreground Extraction Using Iterated Graph Cuts", 2004, ACM Transactions on Graphics (SIGGRAPH '04).

Torsten Seemann, B. Sc (Hons), "Digital Image Processing Using Local Segmentation", Apr. 2002, School of Computer Science and Software Engineering, Faculty of Information Technology Monash University Australia.

* cited by examiner

INTEGRATED INTERACTIVE SEGMENTATION WITH SPATIAL CONSTRAINT FOR DIGITAL IMAGE ANALYSIS

FIELD OF THE INVENTION

The present invention relates to the field of image processing. More specifically, the present invention relates to interactive segmentation for digital image analysis.

BACKGROUND OF THE INVENTION

Image segmentation refers to the process of partitioning a digitized image into meaningful segments with homogeneous characteristics, e.g., color, intensity or texture. Due to the wide range of image context, quality and complexity, fully-automatic image segmentation seems to be challenging, and therefore, in recent years, semi-automatic or interactive segmentation has been comprehensively studied. As its name implies, the segmentation algorithm is to be guided by the interaction with users, via one or several rounds, so that it is able to intelligently learn from user-marked examples of foreground and background, get clues on how the user defines the target, and apply the learned rule to other unmarked areas.

A general interactive segmentation framework includes a friendly user interface which enables a user to impose certain hard constraints, anywhere within the image domain, to mark certain pixels to be absolutely part of the image foreground and background, respectively. Although the total number of marked pixels is very limited, sometimes no more than several hundred, they are the interactive clues which are able to be utilized by certain machine learning algorithms to train a particular model online. Then, this online-trained model is applied to the rest of the image for prediction purposes. By presenting the prediction results to the user, a second-round interaction is to be given again if there is a need to make modifications. This interactive procedure repeats until the user feels satisfied. FIG. 1 illustrates such an online model learning-based interaction framework.

Comprehensive studies have been conducted trying to optimize each of the three modules.

Regarding interaction with users, people are seeking loose inputs to mark foreground and background. Loosely positioned marking lines, like the strokes given by a brush are more preferable than precise boundary definition. An exemplary case is shown in FIG. 2, where red (200) and blue (202) strokes are indicating foreground and background respectively.

Regarding model learning, supervised learning has been studied a lot in computer vision, and many classic supervised learning algorithms are already developed, such as Supporting Vector Machine (SVM), boosting and others. Statistics-based modeling, such as Gaussian Mixture Model (GMM) is also frequently mentioned in many literatures.

Regarding prediction, it is implemented by applying the learned model to the rest of image. The output of such an inference procedure is a likelihood map, indicating the probability of each pixel to be classified as foreground or background.

An alternative to model learning/prediction is to define a cost function integrating user-marked foreground and background, and the segmentation is found by optimizing this cost function among all the possible segmentations. A typical example is graph cuts which has been widely used in interactive segmentation.

SUMMARY OF THE INVENTION

An integrated interactive segmentation with spatial constraint method utilizes a combination of several of the most popular online learning algorithms into one and implements a spatial constraint which defines a valid mask local to the user's given marks. Additionally, both supervised learning and statistical analysis are integrated, which are able to compensate each other. Once prediction and activation are obtained, pixel-wised multiplication is conducted to fully indicate how likely each pixel belongs to the foreground or background.

In one aspect, a method of image processing programmed in a memory of a device comprises utilizing user input to generate a learned model for prediction, utilizing statistical analysis for activation, defining a local mask from the user input, wherein the local mask limits the image processing to a local area and performing object segmentation using a combination of the prediction and the activation. The method further comprises receiving input from a user. The input comprises the user marking a foreground and a background. The method further comprises combining the prediction and the activation using pixel-wise multiplication. The method further comprises generating a cost function from the prediction and the activation. The cost function is optimized by graph cuts. The cost function utilizes edge detection information. Object segmentation is to distinguish a foreground and a background of an image. The method further comprises repeating steps until a user is satisfied with a result of the image processing. The user input for defining the local mask comprises an enclosed area. The device comprises a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a tablet computer, a portable music device, a video player, a DVD writer/player, a high definition video writer/player, a television, a microscope and a home entertainment system.

In another aspect, a method of image processing programmed in a memory of a device comprises utilizing user input to generate a learned model for prediction, utilizing statistical analysis for activation, combining the prediction and the activation, defining a local mask from the user input, wherein the local mask limits the image processing to a local area, generating a cost function from the prediction and the activation and performing object segmentation using a combination of the prediction and the activation. The method further comprises receiving input from a user. The input comprises the user marking a foreground and a background. Combining the prediction and the activation comprises using pixel-wise multiplication. The cost function is optimized by graph cuts. The cost function utilizes edge detection information. Object segmentation is to distinguish a foreground and a background of an image. The method further comprises repeating steps until a user is satisfied with a result of the image processing. The user input for defining the local mask comprises an enclosed area. The device comprises a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a tablet computer, a portable music device, a video player, a DVD writer/player, a high definition video writer/player, a television, a microscope and a home entertainment system.

In another aspect, a device comprises a memory for storing an application, the application for: utilizing user input to generate a learned model for prediction, utilizing statistical analysis for activation, defining a local mask from the user input, wherein the local mask limits the image processing to a local area and performing object segmentation using a combination of the prediction and the activation and a processing component coupled to the memory, the processing component configured for processing the application. The application is further for receiving input from a user. The input comprises the user marking a foreground and a background. The application is further for combining the prediction and the activation using pixel-wise multiplication. The application is further for generating a cost function from the prediction and the activation. The cost function is optimized by graph cuts. The cost function utilizes edge detection information. Object segmentation is to distinguish a foreground and a background of an image. The application repeats steps until a user is satisfied with a result of the image processing. The user input for defining the local mask comprises an enclosed area.

DETAILED DESCRIPTION OF THE PREFERRED EMBODIMENT

An integrated interactive segmentation with spatial constraint is described herein. Integrated means the combination of several of the most popular online learning algorithms into one. In contrast to existing approaches which apply a learned segmentation rule globally to all other unmarked regions, spatial constraint is implemented which defines a valid mask local to the user's given marks.

During the model learning stage, a user's inputs are treated as training samples, or they are able to help define the cost function where a graph cut optimizes this cost function to find the best segmentation. This strategy usually suffers from insufficient training samples marked by a user. By insufficient, it not only means the number of training samples is very limited, but also the diversity of the training sample which cannot fully cover the complicated image context, which is the major reason for over-fitting, e.g., poor predictive performance when applied to unmarked regions.

During the prediction stage, the learned model is to be applied to the rest of the image to get segmentation based on local clues only. However, as mentioned above, the insufficient clues might be only locally-meaningful. When applying the locally-learned model to the whole image domain, the poor predictive performance might be expected again.

Disclosed herein is an integrated interactive segmentation algorithm with spatial constraint to overcome insufficient training sample problem.

Figure 1:
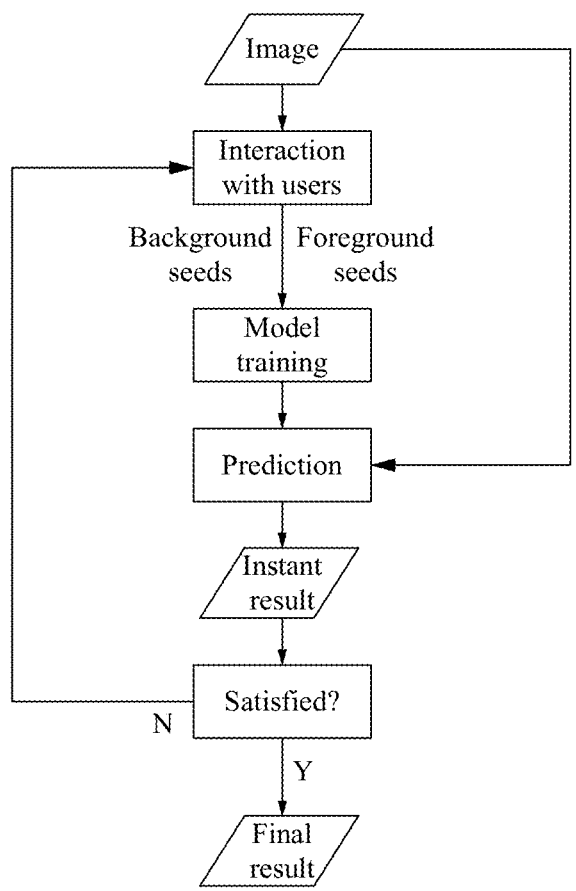
FIG. 1 illustrates an interactive segmentation framework according to some embodiments.
Figure 2:
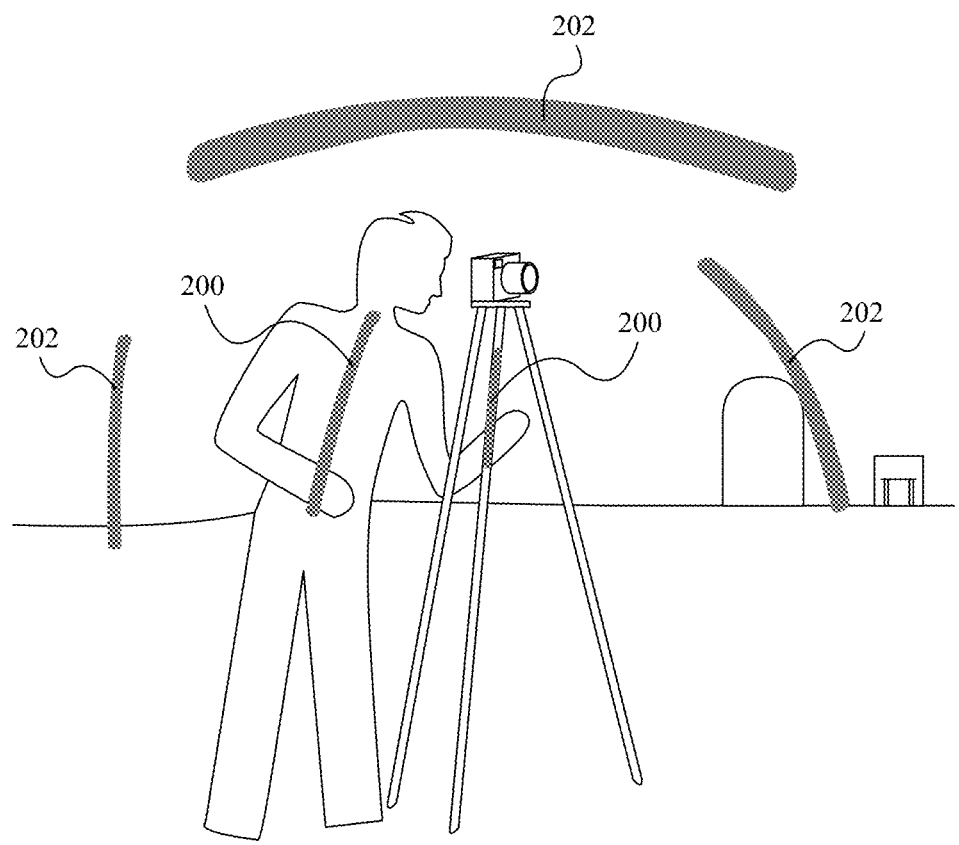
FIG. 2 illustrates an example of loosely positioned marking lines to indicate foreground and background according to some embodiments.
Figure 3:
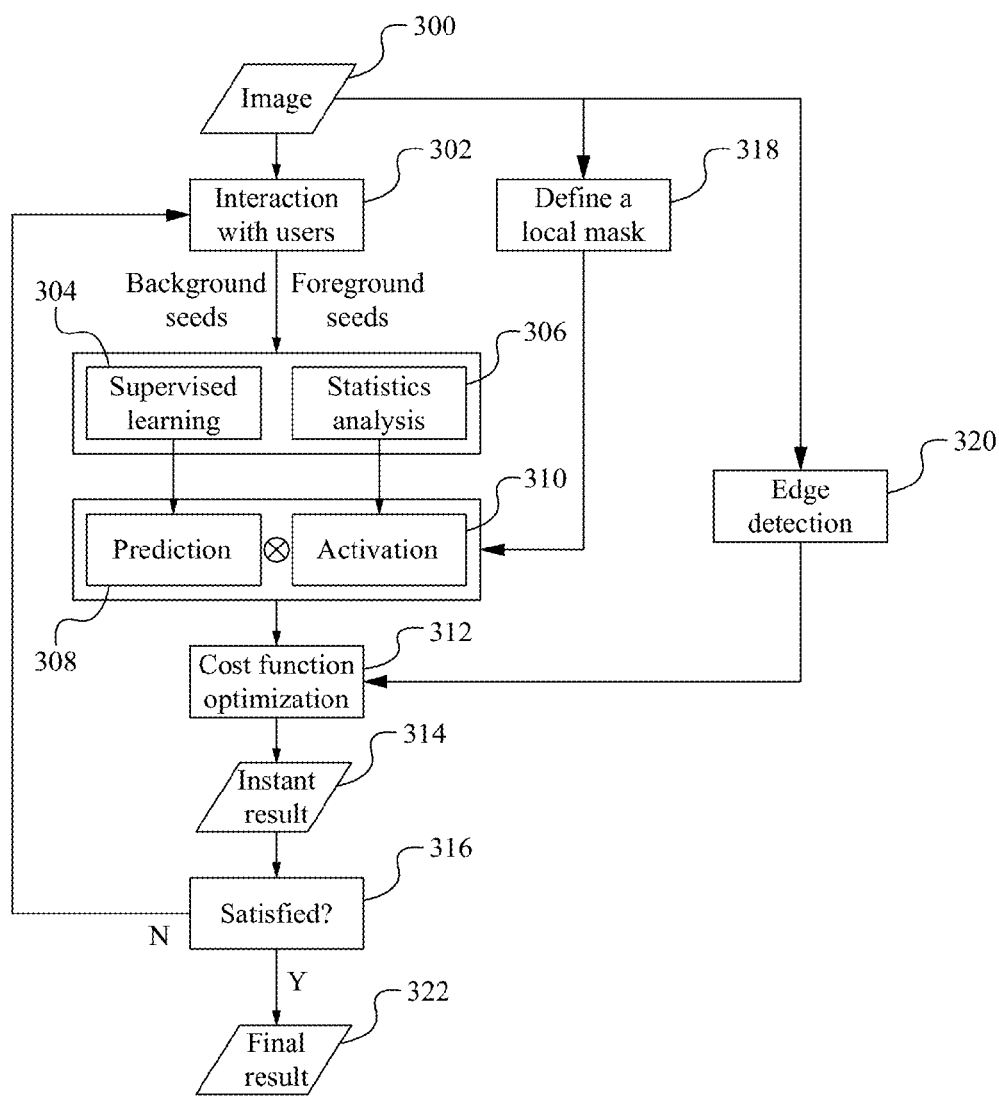
FIG. 3 illustrates an interactive segmentation framework according to some embodiments.

The interactive segmentation framework includes the modules shown in FIG. 3. Compared with FIG. 1, there are 4 major improvements: consolidate the original model learning module by combining both supervised learning and statistics analysis, consolidate the original prediction module by multiplying prediction and activation in a pixel-wised manner, define a local valid mask local to the user's strokes before feeding the input image to the prediction/activation module and define and optimize a cost function based on the product of prediction and activation. These improvements, when integrated into a whole system, are superior to any previously existing system.

In FIG. 3, an image 300 is stored. In the step 302, users interact with the image such as by marking the foreground and background in different colors. In the step 304, supervised learning occurs, and in the step 306 statistical analysis is performed. The results of the learning and analysis are sent to prediction 308 and activation 310. The prediction and activation are pixel-wise multiplied and cost function optimization is implemented in the step 312. A result is determined in the step 314. The user is asked if they are satisfied with the updated image in the step 316. If the user is satisfied, then the result is final in the step 322. If the user is not satisfied, the process returns to interaction with the user in the step 302. In some embodiments, the user defines a local mask in the step 318 which is used in conjunction with prediction and activation.

In some embodiments, edge detection is implemented in the step 320, and the result is used with cost function optimization.

The Combination of Supervised Learning and Statistical Analysis

Previous implementations utilize either supervised learning or statistical analysis, but not both. Since a user's inputs are insufficient which might an cause over-fitting problem, both are used so they compensate each other from a different point of view. Each of the learned models is applied independently to the unmarked region, via prediction and activation respectively, and then their results are combined together. More specifically, the model learned from supervised learning, for example, boosting, is applied to unmarked regions to get predictions, and the model parameterized by statistics analysis, for example, GMM, is activated on the unmarked region as well.

The Pixel-Wised Multiplication of Prediction and Activation

Either prediction or activation is a probability map indicating how likely each pixel belongs to foreground. Pixel-wised multiplication is able to be applied to combine these two probability maps together. For example, for a pixel at location (x, y), prediction gives 80% chance to be foreground, while activation says its chance to be foreground is only 50%, then according to both models, this pixel's overall chance belonging to foreground is 40% (80% times 50%).

The Definition of a Valid Mask Local to User's Inputs

Figure 4A:
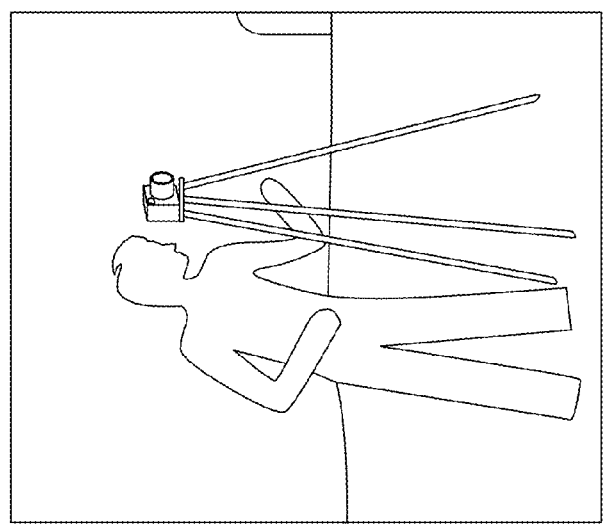
FIGS. 4A-C illustrate segmentation results, foreground and background strokes and a mask locally defined according to some embodiments.
Figure 4B:
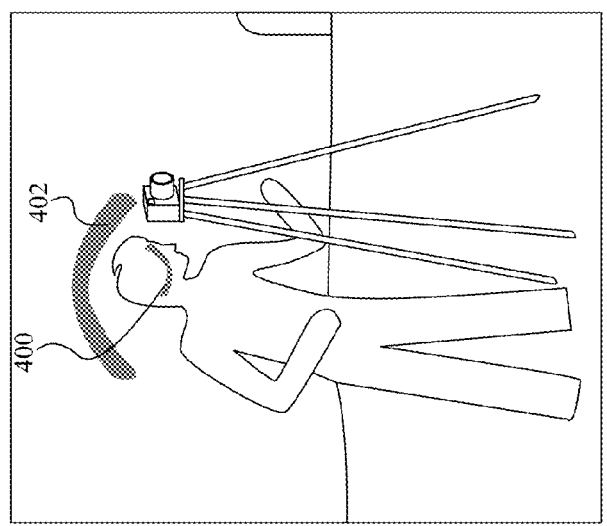

As mentioned earlier, user's inputs are locally-meaningful, especially when user is working on a large-sized image, and his motivation is to correct some local areas which are not satisfied. For example, applying certain segmentation algorithms to a camera man image are able to have segmentation results shown in FIG. 4A, initially. After reviewing the results, a user might be satisfied with the camera man's coat and hair, but wants to correct some local details about the camera man's face which are missing initially. Therefore, the user marks green 400 and blue 402 strokes, shown in FIG. 4B, to indicate that camera man's face should also be included as part of the segmentation, where green 400 and blue 402 strokes correspond to foreground and background, respectively. However, if the model is trained solely based on green and blue strokes, and a locally-trained model is applied to the global image, it would be discovered that the camera man's face has very similar image intensity as those of surrounding sky or even the architectures behind, and the final segmentation results are highly likely to erroneously include other objects which have the same image characteristics.

Figure 4C:
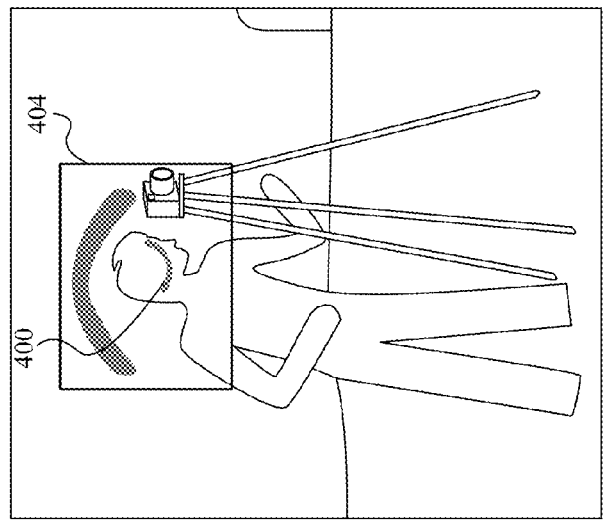

Therefore, a valid mask is defined, encompassing, but spatially confined within a local region, not far away from user-specified foreground/background strokes, as shown by the rectangle 404 in FIG. 4C. By defining such a local mask, it is able to be guaranteed that the given strokes are sufficient for prediction/activation, as this is the region nearest to user's intension. For the rest of image, the image is kept intact unless more strokes are given. In addition, working within such a local mask is able to significantly reduce the computing time, especially when user is satisfied with most of the segmentation results.

The Definition and Optimization of a Cost Function Based on Multiplication of Prediction and Activation As mentioned earlier, cost function optimization is an alternative to supervised learning for the task of image segmentation, and the segments are found by optimizing this cost function among all the possible segmentations. A typical example is graph cuts in interactive segmentation. Integrating graph cuts with model learning, in such a way that the probability map, as a result of prediction and activation multiplication, is able to be utilized to define the cost function, which is optimized by graph cuts to get the improved segmentation results.

The cost function is able to be linked to the product of prediction and activation. According to graph cuts, the cost function is defined by two terms, edge and region terms. The edge term represents the neighboring pixels located on a segment's boundary, e.g., one inside foreground and the other one inside background, while the region term represents the probabilities of foreground and background. To link cost function to the product of prediction and activation, the probability of foreground is interpreted as the sum of probabilities of all the pixels segmented as foreground, and as previously mentioned, the probability of a pixel belonging to foreground is numerically defined as the product of prediction/activation.

Figure 5:
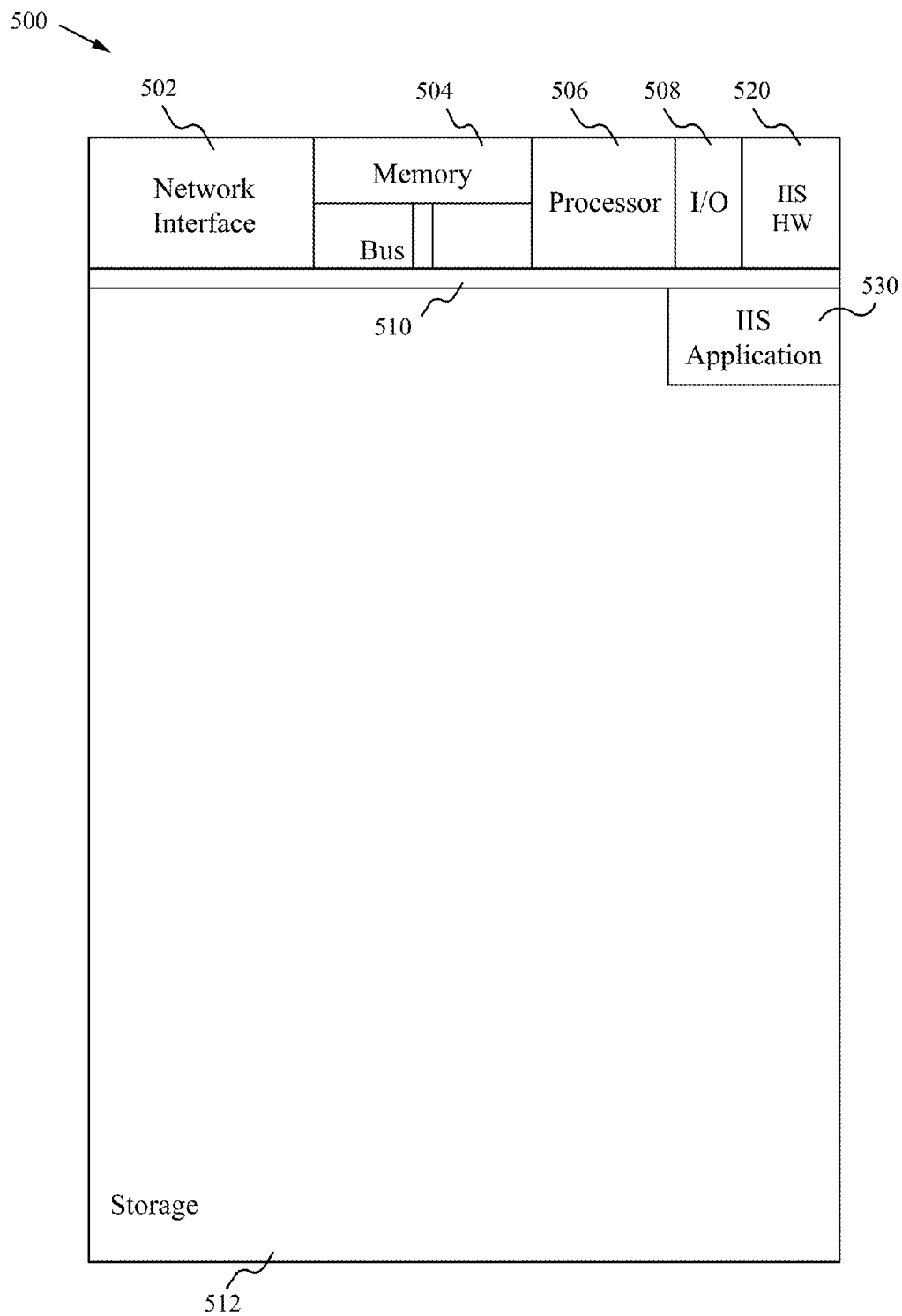
FIG. 5 illustrates a block diagram of an exemplary computing device configured to implement integrated interactive segmentation with spatial constraint according to some embodiments.

FIG. 5 illustrates a block diagram of an exemplary computing device 500 configured to implement the integrated interactive segmentation with spatial constraint according to some embodiments. The computing device 500 is able to be used to acquire, store, compute, process, communicate and/or display information such as images. For example, a computing device 500 is able to be used to acquire and store an image. The integrated interactive segmentation with spatial constraint is typically used during or after acquiring images. In general, a hardware structure suitable for implementing the computing device 500 includes a network interface 502, a memory 504, a processor 506, I/O device(s) 508, a bus 510 and a storage device 512. The choice of processor is not critical as long as a suitable processor with sufficient speed is chosen. The memory 504 is able to be any conventional computer memory known in the art. The storage device 512 is able to include a hard drive, CDROM, CDRW, DVD, DVDRW, Blu-Ray®, flash memory card or any other storage device. The computing device 500 is able to include one or more network interfaces 502. An example of a network interface includes a network card connected to an Ethernet or other type of LAN. The I/O device(s) 508 are able to include one or more of the following: keyboard, mouse, monitor, display, printer, modem, touchscreen, button interface and other devices. In some embodiments, the hardware structure includes multiple processors and other hardware to perform parallel processing. Integrated interactive segmentation with spatial constraint application(s) 530 used to perform integrated interactive segmentation with spatial constraint are likely to be stored in the storage device 512 and memory 504 and processed as applications are typically processed. More or fewer components shown in FIG. 5 are able to be included in the computing device 500. In some embodiments, integrated interactive segmentation with spatial constraint hardware 520 is included. Although the computing device 500 in FIG. 5 includes applications 530 and hardware 520 for implementing integrated interactive segmentation with spatial constraint, the integrated interactive segmentation with spatial constraint is able to be implemented on a computing device in hardware, firmware, software or any combination thereof. For example, in some embodiments, the integrated interactive segmentation with spatial constraint applications 530 are programmed in a memory and executed using a processor. In another example, in some embodiments, the integrated interactive segmentation with spatial constraint hardware 520 is programmed hardware logic including gates specifically designed to implement the method.

In some embodiments, the integrated interactive segmentation with spatial constraint application(s) 530 include several applications and/or modules. In some embodiments, modules include one or more sub-modules as well.

Examples of suitable computing devices include a microscope, a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®/iPhone/iPad, a video player, a DVD writer/player, a Blu-ray® writer/player, a television, a home entertainment system or any other suitable computing device.

To utilize the integrated interactive segmentation with spatial constraint, a device such as a computer is able to be used to analyze an image. The integrated interactive segmentation with spatial constraint is automatically used for performing image/video processing. The integrated interactive segmentation with spatial constraint is able to be implemented automatically without user involvement.

In operation, integrated interactive segmentation with spatial constraint overcomes many problems of past segmentation schemes.

To alleviate the over fitting problem caused by insufficient training samples, both supervised learning and statistical analysis are integrated, which start from two different aspects and could possibly compensate each other. Once prediction and activation are obtained, pixel-wised multiplication is conducted to fully indicate how likely each pixel belongs to foreground.

To avoid global contradiction in terms of image characteristics, e.g., different object sharing the same image characteristics, a valid mask local to user's input is defined before feeding the trained model to the unmarked region. Compared to existing approaches which work globally, the local mask better reflects user's intention, and applies the trained model in a much safer way. The rest of image is kept intact until new strokes are received from the user.

To speed up interaction with the user, the locally-defined valid is also able to perform fast and efficiently.

To balance between a segment's boundary and region properties, a cost function is defined based on the multiplication of prediction and activation, e.g., the result of applying supervised learning and statistical analysis to an unmarked region within the local valid mask, so that graph cuts are able to optimize the cost function to find the best segmentation results based on graph theory.

The integrated interactive segmentation with spatial constraint is able to be used for many image processing applications such as object of interest identification, autofocusing and other applications.

Integrated Interactive Segmentation with Spatial Constraint for Digital Image Analysis 1. A method of image processing programmed in a memory of a device comprising:
   a. utilizing user input to generate a learned model for prediction;
   b. utilizing statistical analysis for activation;
   c. defining a local mask from the user input, wherein the local mask limits the image processing to a local area; and
   d. performing object segmentation using a combination of the prediction and the activation.
2. The method of clause 1 further comprising receiving input from a user.
3. The method of clause 2 wherein the input comprises the user marking a foreground and a background.
4. The method of clause 1 further comprising combining the prediction and the activation using pixel-wise multiplication.
5. The method of clause 1 further comprising generating a cost function from the prediction and the activation.
6. The method of clause 5 wherein the cost function is optimized by graph cuts.
7. The method of clause 5 wherein the cost function utilizes edge detection information.
8. The method of clause 1 wherein object segmentation is to distinguish a foreground and a background of an image.
9. The method of clause 1 further comprising repeating steps a-d until a user is satisfied with a result of the image processing.
10. The method of clause 1 wherein the user input for defining the local mask comprises an enclosed area.
11. The method of clause 1 wherein the device comprises a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a tablet computer, a portable music device, a video player, a DVD writer/player, a high definition video writer/player, a television, a microscope and a home entertainment system.
12. A method of image processing programmed in a memory of a device comprising:
    a. utilizing user input to generate a learned model for prediction;
    b. utilizing statistical analysis for activation;
    c. combining the prediction and the activation;
    d. defining a local mask from the user input, wherein the local mask limits the image processing to a local area;
    e. generating a cost function from the prediction and the activation; and
    f. performing object segmentation using a combination of the prediction and the activation.
13. The method of clause 12 further comprising receiving input from a user.
14. The method of clause 13 wherein the input comprises the user marking a foreground and a background.
15. The method of clause 12 wherein combining the prediction and the activation comprises using pixel-wise multiplication.
16. The method of clause 12 wherein the cost function is optimized by graph cuts.
17. The method of clause 12 wherein the cost function utilizes edge detection information.
18. The method of clause 12 wherein object segmentation is to distinguish a foreground and a background of an image.
19. The method of clause 12 further comprising repeating steps a-d until a user is satisfied with a result of the image processing.
20. The method of clause 12 wherein the user input for defining the local mask comprises an enclosed area.
21. The method of clause 12 wherein the device comprises a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a tablet computer, a portable music device, a video player, a DVD writer/player, a high definition video writer/player, a television, a microscope and a home entertainment system.
22. A device comprising:
    a. a memory for storing an application, the application for:
       i. utilizing user input to generate a learned model for prediction;
       ii. utilizing statistical analysis for activation;
       iii. defining a local mask from the user input, wherein the local mask limits the image processing to a local area; and
       iv. performing object segmentation using a combination of the prediction and the activation; and
    b. a processing component coupled to the memory, the processing component configured for processing the application.
23. The device of clause 22 wherein the application is further for receiving input from a user.
24. The device of clause 23 wherein the input comprises the user marking a foreground and a background.
25. The device of clause 22 wherein the application is further for combining the prediction and the activation using pixel-wise multiplication.
26. The device of clause 22 wherein the application is further for generating a cost function from the prediction and the activation.
27. The device of clause 26 wherein the cost function is optimized by graph cuts.
28. The device of clause 26 wherein the cost function utilizes edge detection information.
29. The device of clause 22 wherein object segmentation is to distinguish a foreground and a background of an image.
30. The device of clause 22 wherein the application repeats steps i-iv until a user is satisfied with a result of the image processing.
31. The device of clause 22 wherein the user input for defining the local mask comprises an enclosed area.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A method of image processing programmed in a memory of a device comprising:
   a. utilizing user input to generate a learned model for prediction;
   b. utilizing statistical analysis for activation;
   c. defining a local mask from the user input, wherein the local mask limits the image processing to a local area, further wherein the user input includes marking foreground and background in different colors;
   d. combining the prediction and the activation using pixel-wise multiplication, wherein the prediction and the activation are each probability maps indicating a percentage of a likelihood each pixel is in the foreground;
   e. performing object segmentation using a combination of the prediction and the activation.

2. The method of claim 1 further comprising receiving input from a user.

3. The method of claim 2 wherein the input comprises the user marking a foreground and a background.

4. The method of claim 1 further comprising combining the prediction and the activation using pixel-wise multiplication.

5. The method of claim 1 further comprising generating a cost function from the prediction and the activation.

6. The method of claim 5 wherein the cost function is optimized by graph cuts.

7. The method of claim 5 wherein the cost function utilizes edge detection information.

8. The method of claim 1 wherein object segmentation is to distinguish a foreground and a background of an image.

9. The method of claim 1 further comprising repeating steps a-d until a user is satisfied with a result of the image processing.

10. The method of claim 1 wherein the user input for defining the local mask comprises an enclosed area.

11. The method of claim 1 wherein the device comprises a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a tablet computer, a portable music device, a video player, a DVD writer/player, a high definition video writer/player, a television, a microscope and a home entertainment system.

12. A method of image processing programmed in a memory of a device comprising:
   a. utilizing user input to generate a learned model for prediction;
   b. utilizing statistical analysis for activation;
   c. combining the prediction and the activation using pixel-wise multiplication, wherein the prediction and the activation are each probability maps indicating a percentage of a likelihood each pixel is in the foreground;
   d. defining a local mask from the user input, wherein the local mask limits the image processing to a local area, further wherein the user input includes marking foreground and background in different colors;
   e. generating a cost function from the prediction and the activation; and
   f. performing object segmentation using a combination of the prediction and the activation.

13. The method of claim 12 further comprising receiving input from a user.

14. The method of claim 13 wherein the input comprises the user marking a foreground and a background.

15. The method of claim 12 wherein combining the prediction and the activation comprises using pixel-wise multiplication.

16. The method of claim 12 wherein the cost function is optimized by graph cuts.

17. The method of claim 12 wherein the cost function utilizes edge detection information.

18. The method of claim 12 wherein object segmentation is to distinguish a foreground and a background of an image.

19. The method of claim 12 further comprising repeating steps a-d until a user is satisfied with a result of the image processing.

20. The method of claim 12 wherein the user input for defining the local mask comprises an enclosed area.

21. The method of claim 12 wherein the device comprises a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a tablet computer, a portable music device, a video player, a DVD writer/player, a high definition video writer/player, a television, a microscope and a home entertainment system.

22. A device comprising:
   a. a memory for storing an application, the application for:
      i. utilizing user input to generate a learned model for prediction;
      ii. utilizing statistical analysis for activation;
      iii. defining a local mask from the user input, wherein the local mask limits the image processing to a local area, further wherein the user input includes marking foreground and background in different colors;
      iv. combining the prediction and the activation using pixel-wise multiplication, wherein the prediction and the activation are each probability maps indicating a percentage of a likelihood each pixel is in the foreground; and
      v. performing object segmentation using a combination of the prediction and the activation; and
   b. a processing component coupled to the memory, the processing component configured for processing the application.

23. The device of claim 22 wherein the application is further for receiving input from a user.

24. The device of claim 23 wherein the input comprises the user marking a foreground and a background.

25. The device of claim 22 wherein the application is further for generating a cost function from the prediction and the activation.

26. The device of claim 25 wherein the cost function is optimized by graph cuts.

27. The device of claim 25 wherein the cost function utilizes edge detection information.

28. The device of claim 22 wherein object segmentation is to distinguish a foreground and a background of an image.

29. The device of claim 22 wherein the application repeats steps i-iv until a user is satisfied with a result of the image processing.

30. The device of claim 22 wherein the user input for defining the local mask comprises an enclosed area.

* * * * *